US 6,688,437 B2

(12) United States Patent
Usherovich

(10) Patent No.: US 6,688,437 B2
(45) Date of Patent: Feb. 10, 2004

(54) WHEELCHAIR BRAKE SYSTEM WITH ANTI-ROLLBACK AND ANTI-TIP CAPABILITIES

(75) Inventor: Boris Usherovich, Staten Island, NY (US)

(73) Assignee: Universal Medical Products, Inc., Laurence Harbor, NJ (US)

( * ) Notice: Subject to any disclaimer, the term of this patent is extended or adjusted under 35 U.S.C. 154(b) by 0 days.

(21) Appl. No.: 10/117,489

(22) Filed: Apr. 5, 2002

(65) Prior Publication Data
US 2002/0175027 A1 Nov. 28, 2002

Related U.S. Application Data
(60) Provisional application No. 60/282,826, filed on Apr. 10, 2001.

(51) Int. Cl.$^7$ .................................................. B60T 1/00
(52) U.S. Cl. ............................ 188/2 F; 188/5; 188/69
(58) Field of Search ................. 188/5, 2 F, 68, 188/69; 280/304.1, 250.1, 763.1, 755; 297/DIG. 4, 310

(56) References Cited

U.S. PATENT DOCUMENTS

| 196,570 | A | | 10/1877 | Dyer |
| 633,266 | A | | 9/1899 | Jamieson |
| 1,090,011 | A | | 3/1914 | Ballinger |
| 2,765,839 | A | | 10/1956 | Arpin |
| 2,792,874 | A | | 5/1957 | Sundberg |
| 3,887,210 | A | | 6/1975 | Funke |
| 4,033,433 | A | | 7/1977 | Kirk |
| 4,125,269 | A | * | 11/1978 | Kiel ........................... 188/2 F |
| 4,342,465 | A | | 8/1982 | Stillings |
| 4,385,769 | A | | 5/1983 | Molino |
| 4,565,385 | A | | 1/1986 | Morford |
| 4,589,525 | A | | 5/1986 | Phipps et al. |
| 4,856,959 | A | | 8/1989 | Tabayashi |
| 4,877,260 | A | | 10/1989 | Howland |
| 5,036,959 | A | * | 8/1991 | Saro ........................... 188/2 F |
| 5,137,295 | A | | 8/1992 | Peek |
| 5,197,750 | A | | 3/1993 | DiGeorge |
| 5,203,433 | A | | 4/1993 | Dugas |
| 5,263,729 | A | | 11/1993 | Watwood et al. |
| 5,348,336 | A | | 9/1994 | Fernie et al. |

(List continued on next page.)

FOREIGN PATENT DOCUMENTS

DE 03743477 A1 7/1989
GB 2 034 427 A 6/1980

Primary Examiner—Jack Lavinder
Assistant Examiner—Mariano Sy
(74) Attorney, Agent, or Firm—Dilworth & Barrese, LLP

(57) ABSTRACT

A brake and anti-tipping system for a conventional wheelchair is disclosed. The system engages the ground to prevent rearward movement of a wheelchair and is disengaged when the wheelchair is occupied. The braking and anti-tipping system comprises a pivotable member which is pivotably supported between portions of a wheelchair frame assembly, a pair of arms each of which is fastened to the pivotable member, an abutment member which is supported on upper ends of arms, and a biasing member which is secured between the wheelchair frame assembly and wheelchair brake system. In another embodiment, the braking system includes a pair of mounting plates which are adapted and configured to be secured to opposite sides of the wheelchair frame, a pivotable frame member positioned between the mounting plates, at least one arm and at least one leg which are each pivotably mounted between the mounting plates, an abutment member and at least one connector, connected between the pivotable frame member connected to the arm and the leg. The system further includes a handle lock which is movable into engagement with the leg for keeping the leg in a movable position of the wheelchair.

14 Claims, 9 Drawing Sheets

U.S. PATENT DOCUMENTS

| | | |
|---|---|---|
| 5,358,266 A | 10/1994 | Roth et al. |
| 5,456,336 A | 10/1995 | Bopp |
| 5,509,673 A | 4/1996 | Wu et al. |
| 5,894,912 A * | 4/1999 | Dobben .................. 188/2 F |
| 6,047,979 A * | 4/2000 | Kraft et al. .............. 280/250.1 |
| 6,092,824 A | 7/2000 | Ritchie et al. |
| 6,113,189 A * | 9/2000 | Bennett et al. ............ 297/376 |
| 6,217,114 B1 * | 4/2001 | Degonda .................. 297/325 |
| 6,347,688 B1 * | 2/2002 | Hall et al. .................. 188/5 |
| 6,394,476 B1 * | 5/2002 | Molnar .................... 280/250.1 |
| 6,454,285 B1 * | 9/2002 | Koenig .................... 280/250.1 |

* cited by examiner

WHEELCHAIR BRAKE SYSTEM WITH ANTI-ROLLBACK AND ANTI-TIP CAPABILITIES

This application claims priority to a provisional application entitled "WHEELCHAIR BRAKE SYSTEM WITH ANTI-ROLLBACK AND ANTI-TIP CAPABILITIES" filed on Apr. 10, 2001, and assigned application Serial No. 60/282,826, the contents of which are hereby incorporated by reference.

BACKGROUND OF THE INVENTION

1. Technical Field

The present disclosure is directed to a braking system for a wheelchair, and more particularly, to a braking system for a wheelchair which prevents rearward movement of the wheelchair when there is no wheelchair occupant and includes anti-tip capability.

2. Background of the Related Art

Wheelchairs have become very common and indispensable instruments. Brakes or anti-tipping structures on the wheelchairs, which prevent movement of the wheelchairs in all directions are known. Such brakes or anti-tipping structures typically include a locking mechanism that engages various parts of the wheelchair. Various types of improved brake systems have been developed.

For example, U.S. Pat. No. 4,565,385 to Morford is directed to a tiltable supporting wheelchair mechanism mounted on a conventional wheelchair, comprising a tilting mechanism for controlled raising of the front of the wheelchair above a floor, a leg support means for selectively supporting an occupant's leg, and a head rest means mounted to the wheelchair.

U.S. Pat. No. 5,137,295 to Peek is directed to a wheelchair having an active anti-tipping assembly to prevent its rider from tipping over backwards when a backrest frame is reclined rearwardly. The anti-tipping assembly has a pair of laterally spaced linkage members whose top ends are pivotally connected to the backrest frame. The bottom ends of the linkage members are pivotally connected to leg members at a point intermediate to their length. The leg members in turn have their top ends pivotally connected to the rear ends of the longitudinally extending bottom frame members of the wheelchair frame. The linkage members are adjustable in length. The anti-tipping leg members have rollers secured to their rearward ends.

U.S. Pat. No. 5,203,433 to Dugas is directed to a wheelchair having an automatic braking assembly which automatically locks one or both wheels of the wheelchair when a patient attempts to rise. The automatic braking assembly includes a movable seat, a locking bar connected to a locking member rigidly connected to a hub of the wheel which is received in the cavity of the locking bar to selectively lock the hub and wheel in a stationary position.

U.S. Patent No. 6,092,824 to Ritchie et al. discloses a wheelchair anti-rollback assembly which prevents the wheelchair from rolling backwards and away from its occupant as the occupant attempts to mount or dismount the wheelchair. The wheelchair includes a braking member that engages the drive wheels to prevent rearward movement of the wheelchair when the seat is not occupied.

Even though these devices may be suitable for the specific individual purposes for which they are designed, a need exists for a brake system which is mounted on a conventional wheelchair, and which may engage the ground to prevent rearward movement of the wheelchair, and which may be disengaged without requiring the occupant to separately operate the braking system.

SUMMARY OF THE INVENTION

An object of the present invention is to provide a novel type of braking and anti-tip assembly which is simple, convenient, economical and easily adaptable to a conventional wheelchair.

The braking and anti-tip assembly has a pivotable member which is pivotably supported between portions of the wheelchair frame assembly, a pair of arms each of which is fastened to the pivotable member, a pair of stops each of which is fastened to each lower end portion of the arms, an abutment member which is supported on upper ends of arms beneath the wheelchair seat, and a biasing member which is positioned to pivot the pivotable member in a direction to urge the abutment member upwardly into the underside of the seat of the wheelchair and urge the pair of stops downwardly onto the surface on which the wheelchair is supported. The stops are preferably formed of a non-slip material, such as rubber. The shape of the abutment member can be rectangular, circular, square etc., and the abutment preferably has padding positioned about the upper ends of the arms. The biasing member may comprise a coil spring, a torsion spring, or other devices well known in that art.

In another preferred embodiment of the present invention, the system has an abutment member which is secured to an upper arm beneath the wheelchair seat, a pair of mounting plates which are adapted and configured to be secured to opposite sides of the wheelchair, a pivotable frame member which extends between the mounting plates, an arm connected between the abutment member and the pivotable frame member, two legs which are pivotably mounted between the mounting plates about pivotable shafts, two stops which are fastened to the lower end portions of the legs, and two connectors. The connectors are connected between a first connecting port of the pivotable frame member connected to the arm and a second connecting port of the leg. The connectors are pivotably connected to the first connecting port and pivotably and slidably connected to the legs via elongated slots formed in the second connecting port of the leg. The pivotable frame member consists of three parts linked to each other, and is adjustable in length. The system further comprises a handle lock which can be engaged with the leg for maintaining a movable position of the wheelchair.

BRIEF DESCRIPTION OF THE DRAWINGS

The above objects and other advantages of the present invention will become more apparent from the following detailed description taken in conjunction with the accompanying drawings, in which.

DETAILED DESCRIPTION OF PREFERRED EMBODIMENTS

Figure 1:
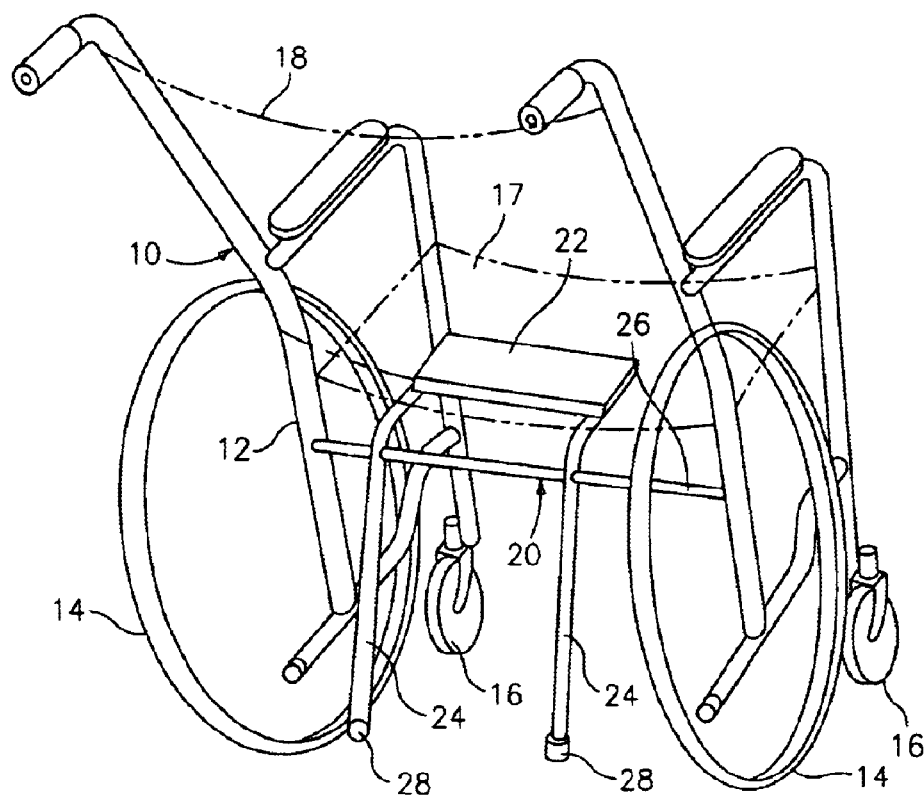
FIG. 1 illustrates a perspective view of a brake system mounted on a wheelchair constructed in accordance with a preferred embodiment of the present invention.

Preferred embodiments of the presently disclosed wheelchair brake system will now be described in detail with reference to the drawings in which like reference numerals designate identical or similar elements in each of the several views.

FIG. 1 illustrates a preferred embodiment of the presently disclosed wheelchair brake system mounted to a conventional wheelchair 10. The conventional wheelchair 10 generally includes a frame 12, a pair of large drive wheels 14, a pair of front caster wheels 16, a seat 17, and a seat back 18. The wheelchair brake system 20 of the present invention includes an abutment member 22, a pair of arms 24, a pivotable member 26 and a pair of stops 28. The stops 28 are preferably formed of a non-slip material, such as rubber. The pivotable member 26 is pivotably supported between portions of the wheelchair frame 12. Each of the arms 24 is fastened to the pivotable member 26 using any known fastening technique including welding, screws, etc., such that the arms 24 have a substantially vertical orientation. The abutment member 22 is supported on upper ends of the arms 24 beneath the wheelchair seat 17. One or more arms can be provided and one or more abutment members may also be installed. Although illustrated as a rectangular plate, the abutment member 22 may assume other configurations, e.g., circular, square, etc. Moreover, the abutment member 22 may be provided with padding (not shown) positioned about the upper ends of the arms 24. The stops 28 are secured to lower ends of arms 24 adjacent the surface on which the wheelchair is supported.

Figures 2, 3:
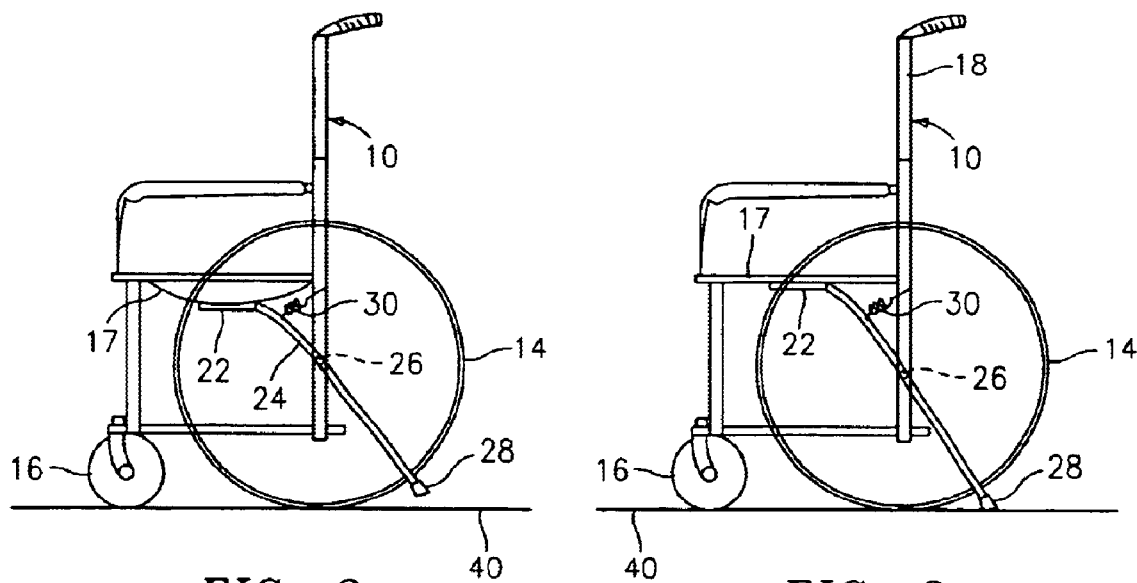
FIG. 2 illustrates a side elevational view showing the brake system mounted on the wheelchair of FIG. 1 before the seat of the wheelchair is occupied.
FIG. 3 illustrates a side elevational view showing the brake system mounted on the wheelchair of FIG. 1 when the seat of the wheelchair is occupied.

Referring now to FIGS. 2 and 3, biasing member 30 is secured between the wheelchair frame 12 and the wheelchair brake system 20. The biasing member 30 is positioned to pivot the pivotable member 26 in a direction to urge the abutment member 22 upwardly into the seat 17 of the wheelchair 10 and urge the stops 28 downwardly onto the surface 40 on which the wheelchair is supported. The wheelchair can have more than one biasing member. The biasing member 30 may take the form of a coil spring 30 mounted between the frame 12 and the arm 24 of the wheelchair brake system 20. Alternately, a torsion spring (not shown) may be secured between the pivotable member 26 and the frame assembly 12. As shown in FIG. 2, before the seat 17 of the wheelchair 10 is occupied, the stops 28 are urged into contact with the surface supporting the wheelchair 10 to prevent rearward movement and tipping of the wheelchair. This is especially beneficial to older or injured people attempting to sit in the wheelchair. As illustrated in FIG. 3, as soon as an occupant is seated in seat 17, abutment member 22 is engaged and is moved downward to pivot arms 24 about pivotable member 26 in a direction to lift stops 28 from the surface 40 supporting the wheelchair 10. The wheelchair 10 can now be moved in both the forward and rearward directions by the patient or the wheelchair occupant.

Figure 4:
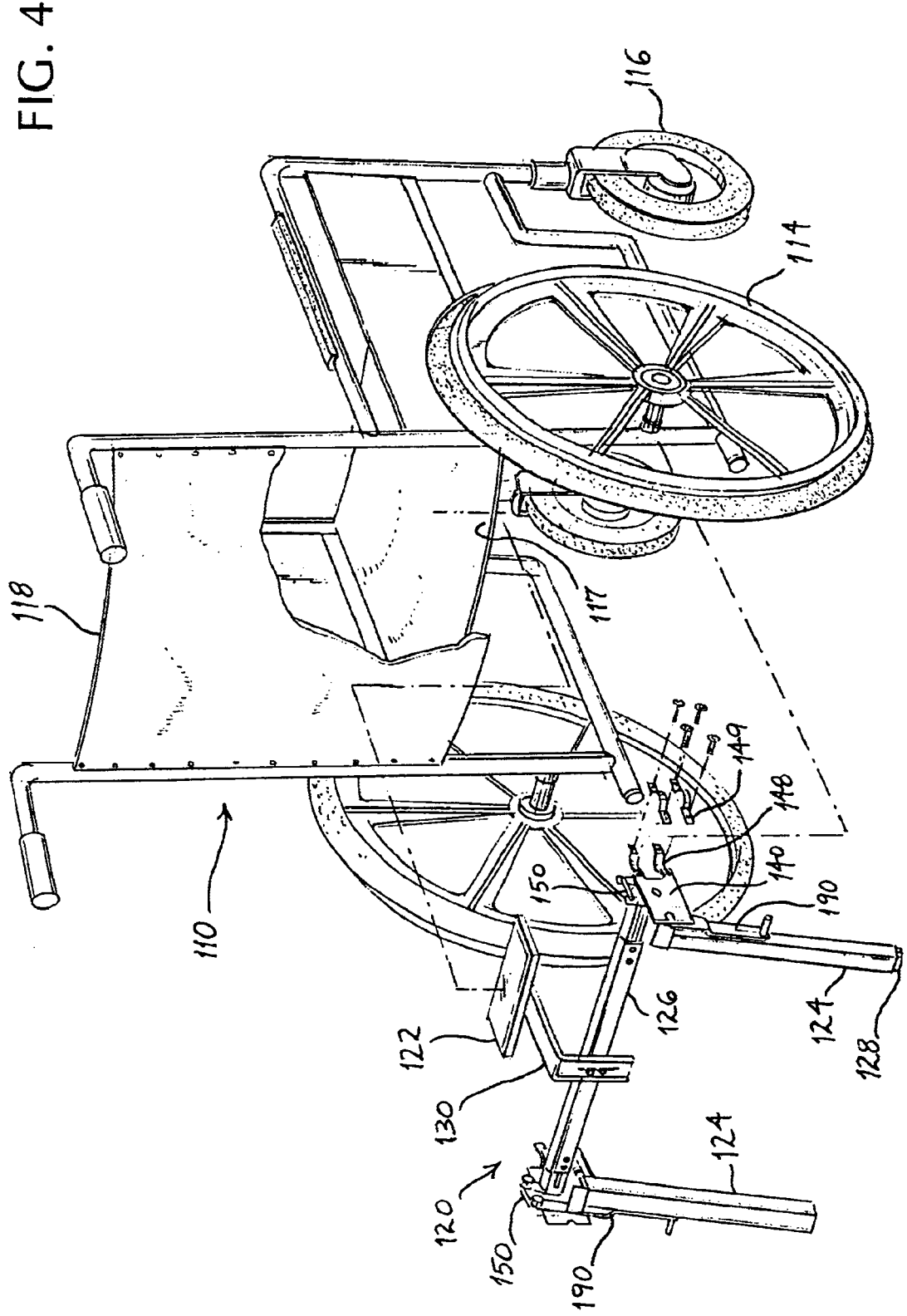
FIG. 4 illustrates an exploded perspective view showing another preferred embodiment of the wheelchair brake system of the present invention.

FIG. 4 illustrates another preferred embodiment of the wheelchair brake system shown generally as 120. The brake system 120 includes an abutment member 122 supported on a upper portion of an arm 130 which preferably has an L-shape, a pivotable frame member 126, a pair of legs 124 with handle locks 190, a pair of connectors 150 and a pair of mounting plates 140. Each of the mounting plates 140 is connected to the pivotable frame member 126 and the legs 124. Each of the mounting plates 140 is adapted and configured to be secured to opposite sides of a wheelchair frame 110 by connectors 148 and 149. The connectors are secured together by bolts.

Figure 5:
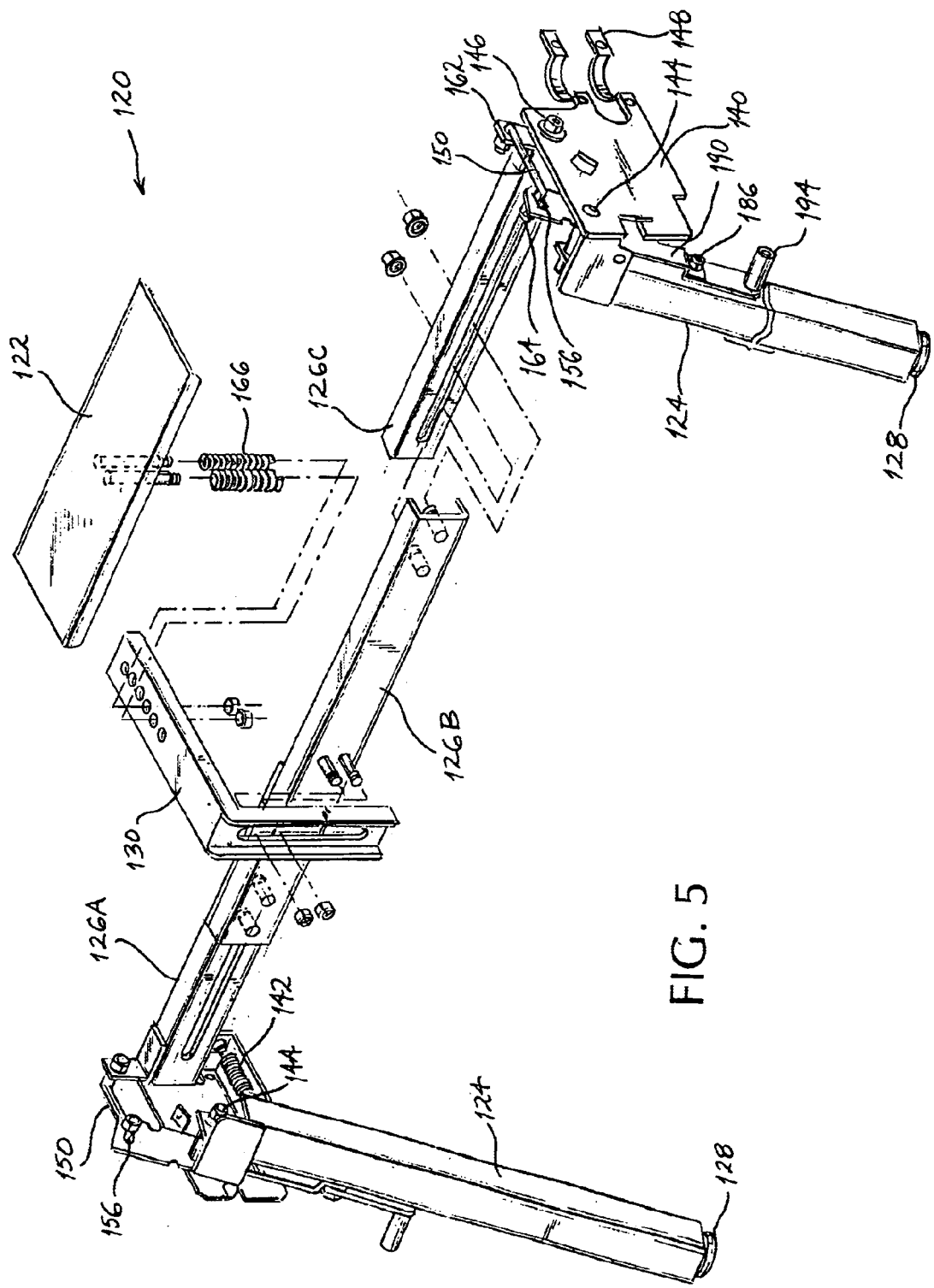
FIG. 5 illustrates a partly exploded perspective view of the brake system of FIG. 4.

FIG. 5 illustrates the wheelchair brake system 120. The abutment member 122 is rectangular but may assume other configurations, e.g., circular, square, etc. The pivotable frame member 126 is adjustable in length and preferably consists of three parts 126A, 126B, and 126C. As shown, member 126B is secured to L-shaped arm 130, which is secured to abutment member 122. Member 126A and member 126C are adjustably and slidably secured to member 126B through a slot and post arrangement, but may be secured in any conventional manner to ensure adjustability. Arm 130 is also preferably height adjustable, and slidably connected to member 126B. The abutment member 122 is supported on the arm 130. Springs 166 may be installed between the arm 130 and the abutment member 122 in order to increase comfort, and padding may be provided between the arm 130 and the abutment member 122 or on the top of the abutment member 122 for the same reason. The horizontal and vertical position of the abutment member 122 is preferably adjustable. By adjusting the positions of member 126A and member 126C with respect to member 126B, the pivotable frame member 126 may be extended and is adjustable in length to accommodate different size wheelchairs.

Member 126C and member 126A are each connected to one of the mounting plates 140, which are adapted and configured to be secured to opposite sides of wheelchair frame 110 and are each connected to one of legs 124. Legs 124 have stops 128 on the bottom portion thereof. Arm 130 is pivotably mounted between the mounting plates 140 about first pivot shaft 146 installed on the both ends of the pivotable frame member 126, and legs 124 are pivotably mounted between mounting plates 140 about second pivot shafts 144. There are two connectors 150 pivotably connected to a first connecting port 162 installed on the pivotable frame member 126 and pivotably and slidably connected to a second connecting port 164 of the leg 124 via an elongated slot 156 formed in the second connecting port 164. The elongated slot 156 is configured to allow legs 124 to pivot in relation to the connector 150 without the movement of the pivotable frame member 126. The amount of the movement of the leg 124 defines the scope of the movement of the leg 124. The elongated slot 156 can reduce the impact when the leg is touched by an obstructions.

Figure 6:
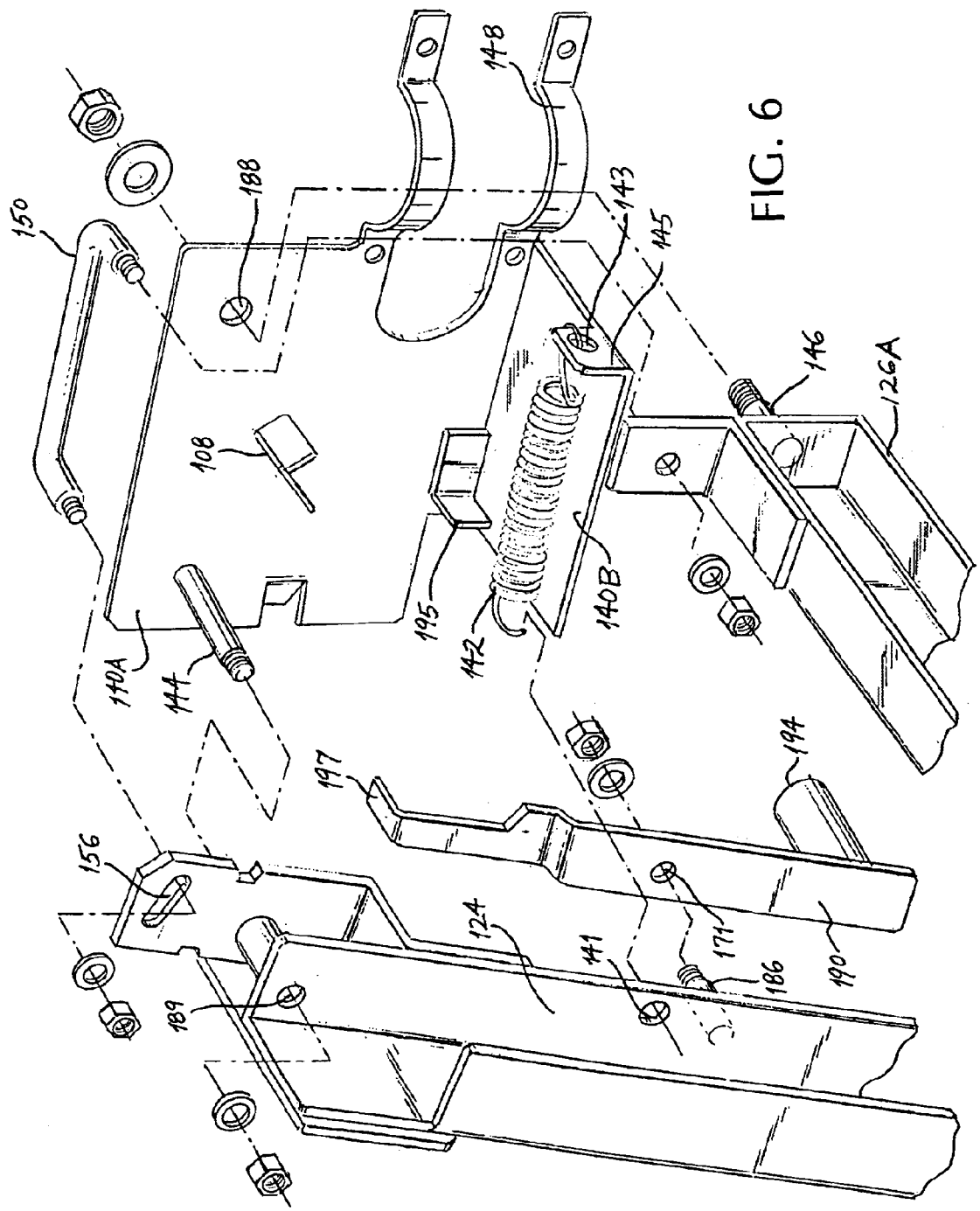
FIG. 6 illustrates an exploded perspective view of the leg assembly of the brake system of FIG. 4.

FIG. 6 illustrates one of the mounting plates 140 and one of the connectors 150 to link to the pivotable frame member 126 and the leg 124 with a handle lock 190. The mounting plate 140 consists of a side mounting plate 140A and a bottom mounting plate 140B arranged perpendicular to the side mounting plate 140A. The side mounting plate 140A has a second pivot shaft 144 which passes through a second pivot shaft connecting hole 189 of the leg 124 and is secured in a conventional manner. A first pivot shaft connecting hole 188 accommodates first pivot shaft 146 on the pivotable frame member 126 and is also secured in a conventional manner. The side mounting plate 140A includes a pair of first frame connectors 148 for securement to the wheelchair frame 112, a stop 108 and an engaging finger port 195 positioned on bottom mounting plate 140B. The bottom mounting plate 140B has a first spring connecting hole 143 for spring 142, and leg 124 has a second spring connecting hole 141. A handle lock 190 is provided, and is secured to leg 124 by shaft 186 which passes through a handle hole 191 of the handle lock 190 and is secured in a conventional manner. Operation of lock 190 is described below with reference to FIGS. 11 and 12.

Pivotable frame members 126A and 126 C are secured to mounting plate 140A and to connectors 150. The legs 124 secured to frame mounting plate 140A and to connectors 150 through slot 156. Spring member 142 is a biasing member to downwardly bias the legs 124 to the ground 40, particularly when the wheelchair is unoccupied. Each leg 124 is pivotable around the second pivot shaft 144 and the spring member 142 urges the lower portion of the leg 124 to move downwardly. The biasing member may be a coil spring as discussed above. Alternately, other biasing members are envisioned.

Figure 7:
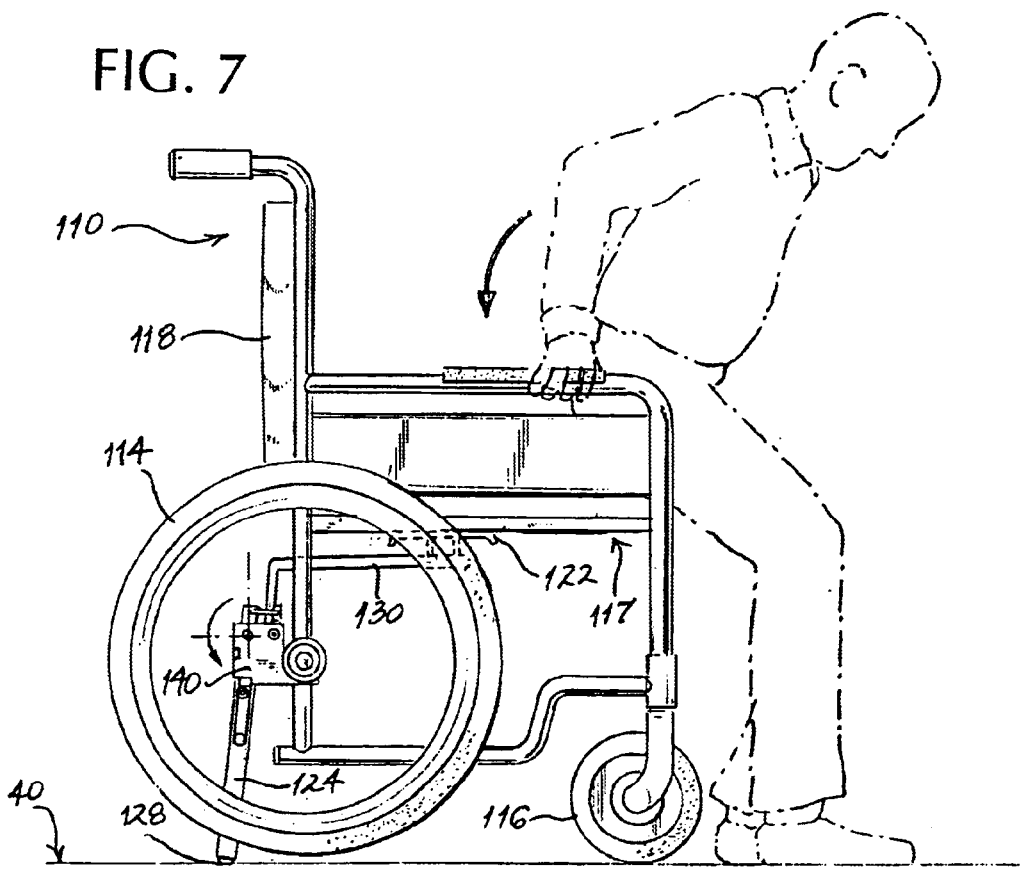
FIG. 7 illustrates a side elevational view showing the brake system of FIG. 4, which is mounted on a wheelchair, when the seat of the wheelchair is unoccupied.
Figure 8:
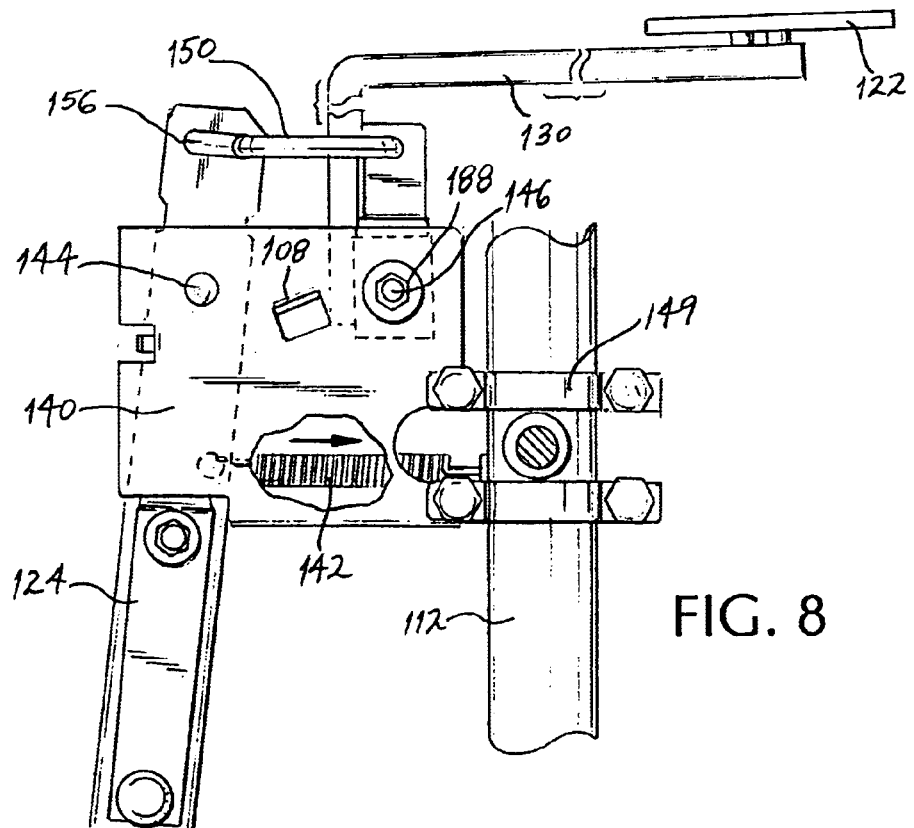
FIG. 8 illustrates a side elevational view showing the mounting assembly of the brake system when the wheelchair is unoccupied as in FIG. 7.

Referring to FIGS. 7 and 8, when the brake system 120 (shown in FIG. 4) is mounted to the wheelchair 110 without an occupant, the biasing member 142 installed on the mounting plate 140 pivots the leg 124 at the second pivot shaft 144 and directs leg 124 downwardly onto the surface 40 on which the wheelchair is supported. Because the leg 124 pulls the connector 150, which is linked to the pivotable frame member 126, pivotable frame member 126 will move in counterclockwise direction about the first pivot shaft 146. The pivotable frame member 126, pivoted in a counterclockwise direction, causes arm 130 to pivot and raise the abutment member 122 under the seat 117 of the wheelchair 110.

Figure 9:
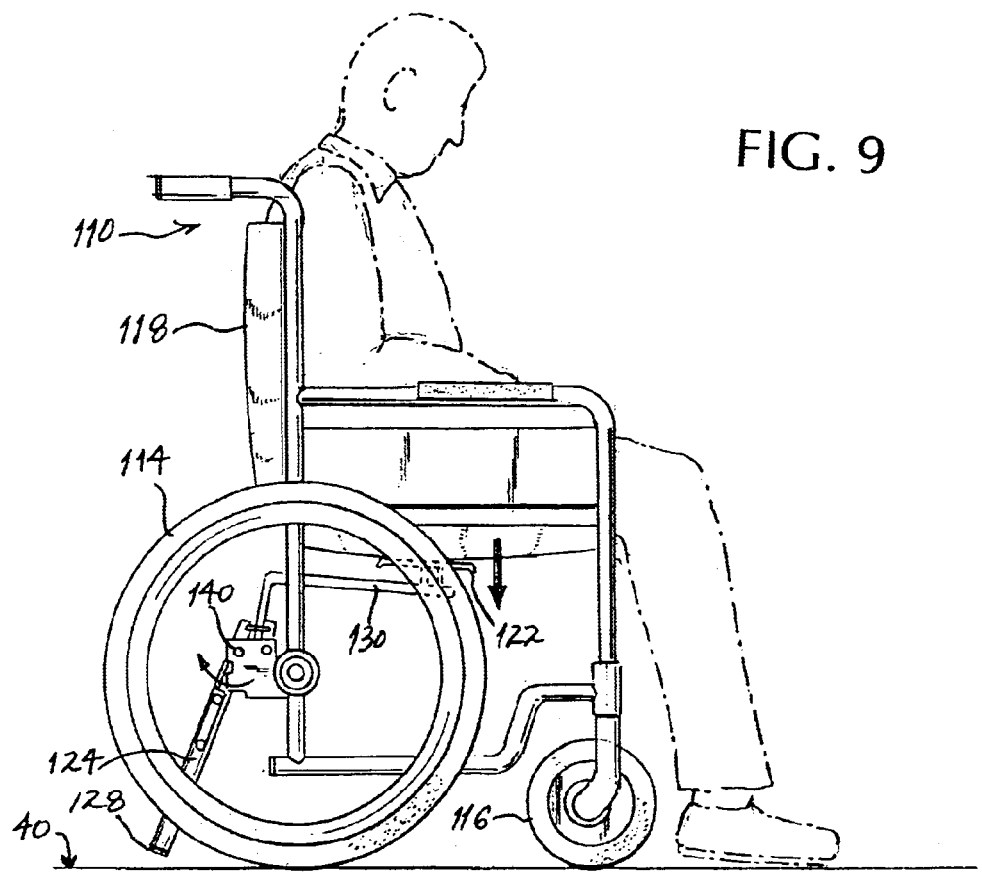
FIG. 9 illustrates a side elevational view showing the brake system of FIG. 4, which is mounted on a wheelchair, when the seat of the wheelchair is occupied.
Figure 10:
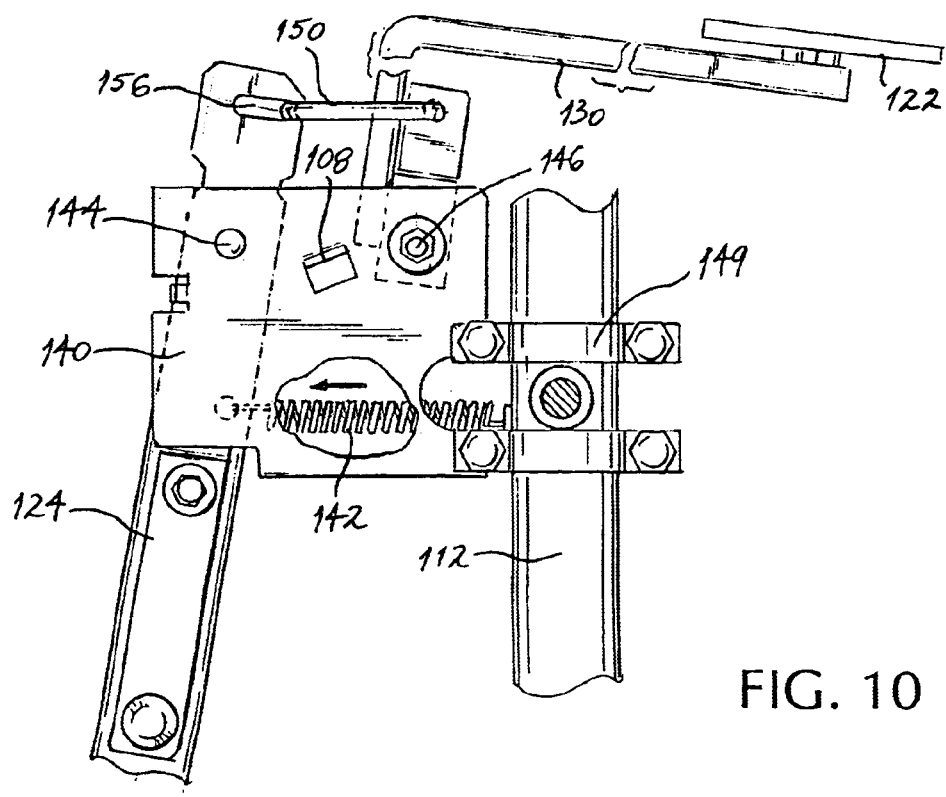
FIG. 10 illustrates a side elevational view showing the mounting assembly of the brake system when the wheelchair is occupied as in FIG. 9.

Referring now to FIGS. 9 and 10, when the wheelchair seat is occupied, the abutment member 122 will move downwardly under the weight of the occupant to pivot arm 130 in a clockwise direction about the first pivot shaft 146. As the arm 130 is pivoted, the connector 150 will pull the leg 124 to pivot the leg 124 in a clockwise direction about the second pivot shaft 144 to lift the stops 128 (See FIG.5) out of engagement with the surface 40 supporting the wheelchair. With the legs 124 in the position shown in FIG. 9, rearwardly of a patient sitting in the wheelchair, the wheelchair is less likely to tip over backwards when the patient sits in the wheelchair.

Figure 11:
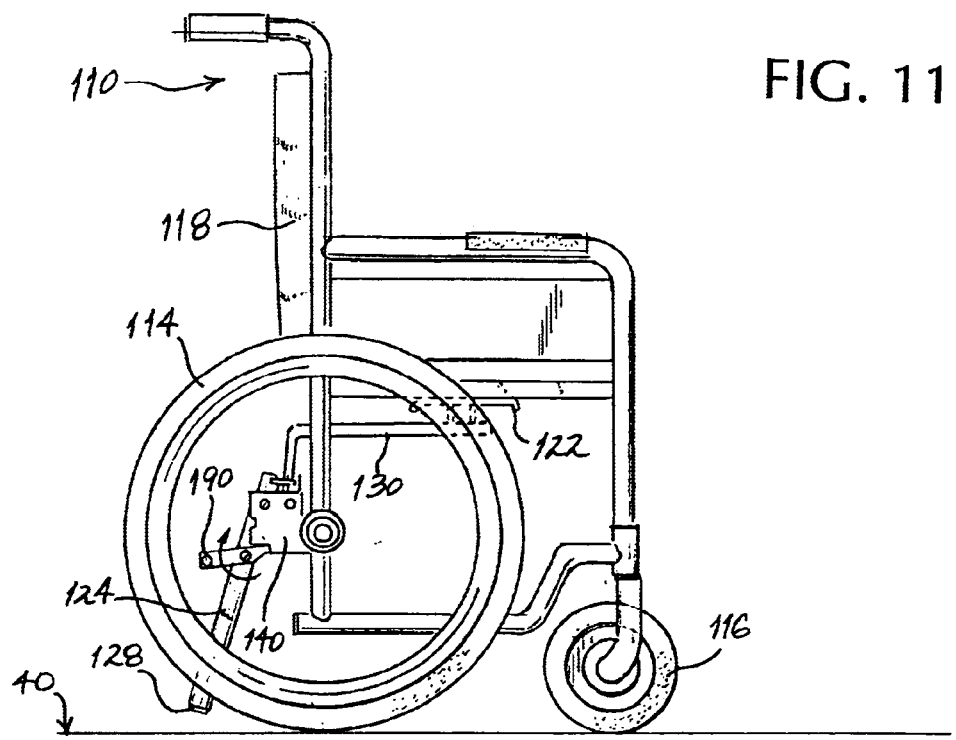
FIG. 11 illustrates a side elevational view showing the brake system of FIG. 4, which is mounted on a wheelchair, when the seat of the wheelchair is unoccupied and the brake system is locked in the disengaged position.
Figure 12:
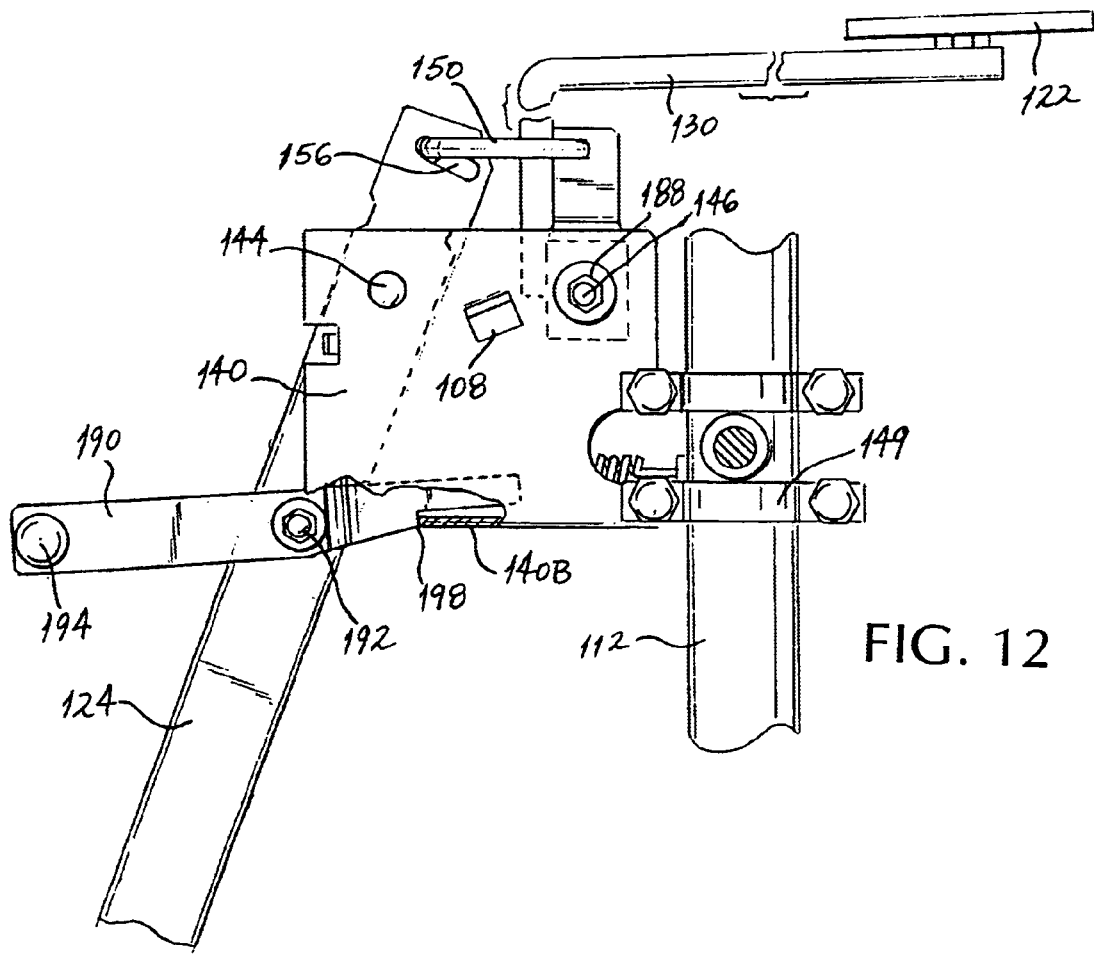
FIG. 12 illustrates a side elevational view showing the brake system locked in the disengaged position as in FIG. 11.

Referring to FIGS. 11 and 12, a handle lock 190 is installed on the leg 124 and includes a knob 194 and an engaging finger 197 (shown in FIG. 6.). When the handle lock 190 is rotated clockwise as shown in FIGS. 11 and 12, an engaging notch 198 engages an end portion of the bottom plate 140B. In this case, the stop 128 of leg 124 is maintained in a position away from the surface 40 and the wheelchair is movable without an occupant. The engaging finger 197 engages the engaging finger port 195 of the mounting plate 140A to prevent the leg 124 from pivoting back in the counter-clockwise direction when the leg 124 is hit by any obstructions.

Figure 13:
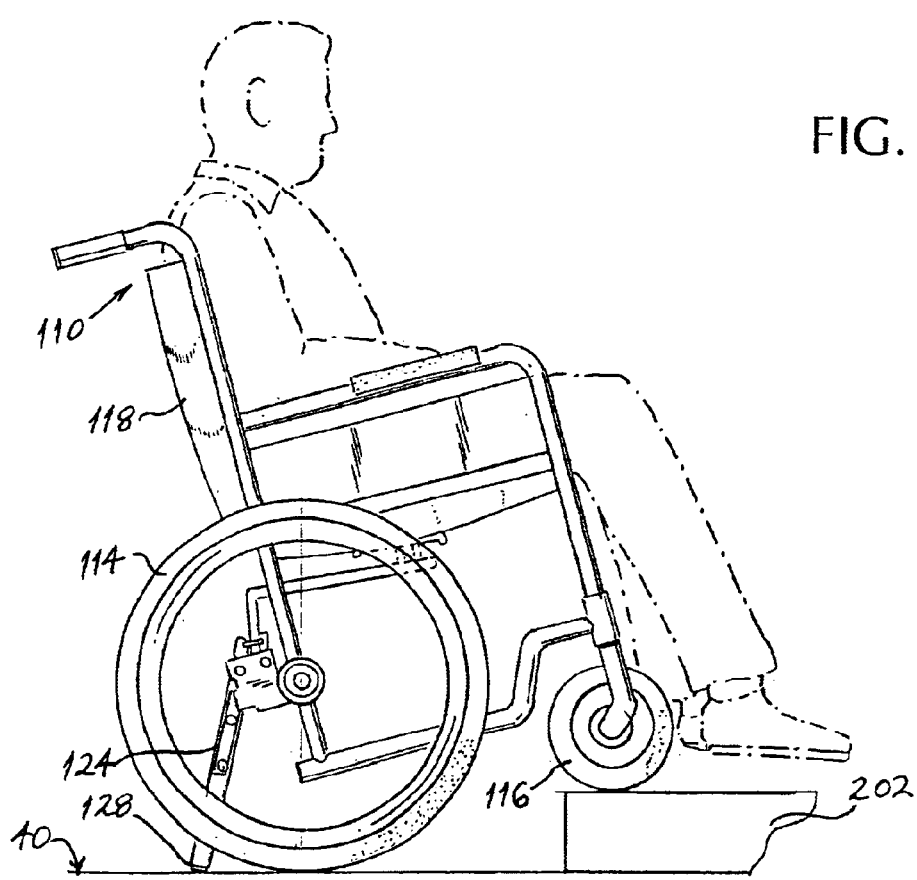
FIG. 13 illustrates a side elevational view showing an anti-tipping position of another preferred embodiment of the brake system of FIG. 4, which is mounted on a wheelchair, when the seat of the wheelchair is occupied.
Figure 14:
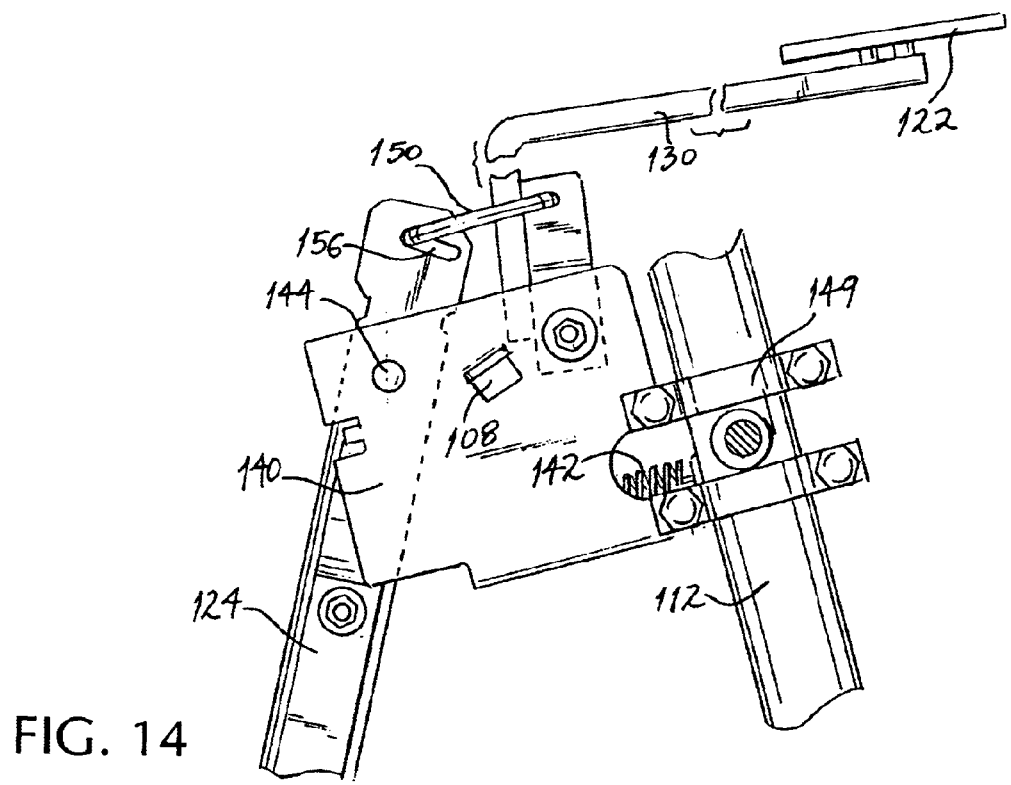
FIG. 14 illustrates a side elevational view showing the anti-tipping position of the brake system as in FIG. 13.

Referring now to FIGS. 13 and 14, with the occupant seated in wheelchair 110, stop 128 is positioned above the ground surface 40. If the wheelchair 110 begins to tip over or is tilted backward, such as when attempting to move over a curb 202 or other obstruction, the stop 128 engages the ground surface 40 to prevent the wheelchair 110 from tipping over backwards. In this case, one end portion of the elongated slot 156 is touched by one end of the connector 150 and the stop 108 is touched simultaneously by one portion of the leg 124 to prevent the wheelchair from tipping over.

Figure 15:
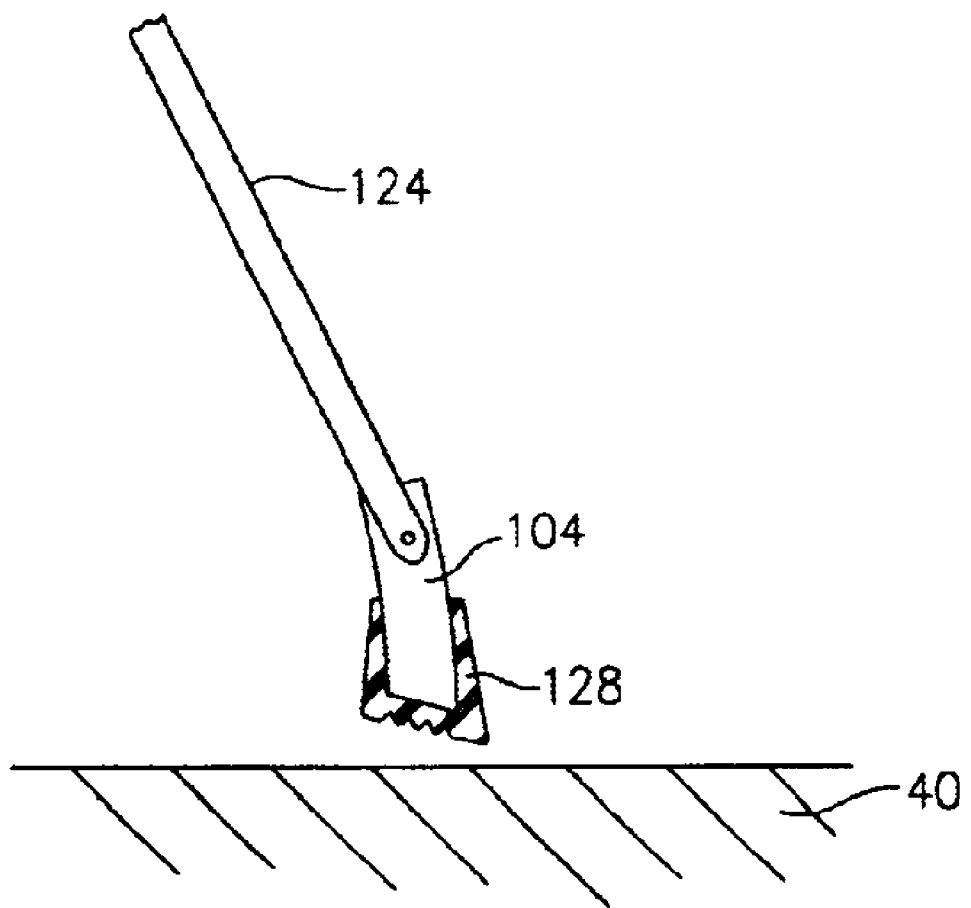
FIG. 15 illustrates a side elevational view showing an embodiment of the leg, the stop and the pivotable foot of the brake system of the present invention.

FIG. 15 illustrates another feature of the presently disclosed wheelchair brake assembly. More specifically, the stop 128 may be supported on a pivotable foot 104. The pivotable foot 104 allows the stop 128 to adjust to the surface to which it engages to allow a greater surface area of the stop 128 to engage the surface 40 supporting the wheelchair and provide a more reliable braking operation, especially on uneven surfaces.

It will be understood that various modifications may be made to the embodiments disclosed herein. Therefore, the above description should not be construed as limiting, but merely as exemplifications within the scope and spirit of the claims appended hereto.

What is claimed is:

1. A brake system for a wheelchair having a frame assembly, a pair of large drive wheels, a pair of front caster wheels, a seat, and a seat back, wherein the large drive wheels and front caster wheels rest upon a surface, comprising:
a pivotable member which is pivotably supported between portions of the wheelchair frame assembly;
at least one arm which is fastened to the pivotable member;
at least one abutment member which is supported on an upper end of the at least one arm and positioned beneath the seat; and
at least one biasing member which is secured between the wheelchair frame assembly and the wheelchair brake system, and positioned to pivot the pivotable member in a direction to urge the abutment member upwardly into the seat of the wheelchair and urge a lower end of the at least one arm downwardly onto the surface.

2. The brake system according to claim 1, further comprising a pair of arms, each of which terminates in a stop member fastened to the lower end of each of the arms.

3. The brake system according to claim 1, wherein the biasing member is one of a coil spring and a torsion spring.

4. The brake system according to claim 2, wherein the stop members are formed of a non-slip material.

5. The brake system according to claim 2, wherein each of the stop members is supported on a pivotable foot member which allows the stop members to adjust to the surface onto which it engages.

6. A brake system for a wheelchair having a frame assembly, a pair of large drive wheels, a pair of front caster wheels, a seat, and a seat back, wherein the large drive wheels and front caster wheels rest upon a surface, comprising:
- a pair of mounting plates which are adapted and configured to be secured to opposite sides of the frame assembly;
- a pivotable member having two ends, each end of which is connected to one of the mounting plates;
- at least one arm fastened to the pivotable member and pivots with the pivotable member;
- at least one leg which is pivotably mounted to at least one of the two mounting plates;
- at least one abutment member which is secured to an upper end of the at least one arm;
- a connector for connecting the at least one leg to its mounting plate; and
- at least one biasing member which is secured between the leg and its mounting plate which biases the end portion of the leg to pivot downwardly onto the surface, the at least one leg pulling the connector to pivot the pivotable member connected to the at least one arm to urge the abutment member upwardly against the seat of the wheelchair.

7. The brake system according to claim 6, further comprising a stop, which is fastened to a lower end portion of the leg.

8. The brake system according to claim 7, wherein the stop is supported on a pivotable foot which allows the stop to adjust to the surface onto which it engages.

9. The brake system according to claim 6, wherein the pivotable member is adjustable for accommodating different size wheelchairs.

10. The brake system according to claim 6, wherein the pivotable member has a first connecting port at each end, each of the legs includes a second connecting port on a top portion thereof, and the connector is connected between the first connecting port and the second connecting port.

11. The brake system according to claim 10, wherein the second connecting port comprises an elongated slot.

12. The brake system according to claim 6, wherein at least one of the legs has a spring biased handle lock which is rotatably movable with respect to leg and engageable with the leg to maintain the legs in a disengaged position with respect to the surface on which the wheelchair is supported.

13. The brake system according to claim 12, wherein at least one of the mounting plates includes an engaging finger port for engagement with the handle lock.

14. A brake system for a wheelchair having a frame assembly, a pair of large drive wheels, a pair of front caster wheels, a seat, and a seat back, wherein the large drive wheels and front caster wheels rest upon a surface, comprising:
- a pair of mounting plates which are adapted and configured to be secured to opposite sides of the wheelchair frame assembly;
- a pivotable member having two ends, each end of which is connected to one of the mounting plates;
- an arm fastened to a middle portion of the pivotable member and pivots with the pivotable member;
- an abutment member which is secured to an upper end of the arm for engaging the seat of the wheelchair;
- a pair of legs each of which is pivotably mounted to one of the mounting plates; and
- a pair of biasing members, each of which is secured between one of the legs and one of the mounting plates and which bias the end portions of the two legs downwardly onto the surface, the legs further pivoting the pivotable member and the arm to urge the abutment member upwardly to engage the seat of the wheelchair.

* * * * *